United States Patent [19]

Lee et al.

[11] Patent Number: 4,965,780

[45] Date of Patent: Oct. 23, 1990

[54] MAGNETO-OPTICAL DATA RECORDING DEVICE USING A WAVELENGTH AND POLARIZATION-SENSITIVE SPLITTER

[75] Inventors: Neville K. S. Lee, Medfield; James Howard, Natick, both of Mass.

[73] Assignee: Digital Equipment Corporation, Maynard, Mass.

[21] Appl. No.: 84,577

[22] Filed: Aug. 12, 1987

[51] Int. Cl.⁵ .................... G11B 11/12; G11B 7/12; G11B 13/04

[52] U.S. Cl. ..................................... 369/13; 369/110

[58] Field of Search .................. 369/13, 110, 112; 360/114, 59; 365/122

[56] References Cited

U.S. PATENT DOCUMENTS

| | | | |
|---|---|---|---|
| 3,869,193 | 3/1975 | Schmit | 350/6.2 |
| 4,397,027 | 8/1983 | Zampiello et al. | 372/94 |
| 4,477,852 | 10/1984 | Ota et al. | 360/114 |
| 4,610,009 | 9/1986 | Connell | 369/13 |
| 4,630,249 | 12/1986 | Braat et al. | 369/13 |
| 4,700,336 | 10/1987 | Yoshida et al. | 369/110 |

FOREIGN PATENT DOCUMENTS

| | | |
|---|---|---|
| 0097035 | 12/1983 | European Pat. Off. . |
| 0126596 | 5/1984 | European Pat. Off. . |
| 0127243 | 5/1985 | European Pat. Off. . |
| 0180459 | 5/1986 | European Pat. Off. . |
| 0195227 | 9/1986 | European Pat. Off. . |
| 0252445 | 1/1988 | European Pat. Off. . |
| 56-101886 | 1/1981 | Japan . |
| 59-58638 | 4/1984 | Japan . |
| 59-89750 | 5/1984 | Japan . |
| 62-12942 | 1/1987 | Japan ................... 360/114 |
| 2095887 | 10/1982 | United Kingdom . |
| 2139784 | 3/1983 | United Kingdom . |

OTHER PUBLICATIONS

MacLeod, H. A., "Dichroic Beam Splitters", Society of Photo Optical Instrumentation Eng., vol. 695 Optical Mass Data Storage II, (1986).

Botez, D., "Recent Developments in High-Power Single-Element Fundamental-Mode Didode Lasers", Laser Focus-Electro Optics, Mar. 1987.

Mansuripur et al., "Optimum Disk Structures and Engergetics of Domain Formation in Magneto-Optical Recording", IEEE Transactions on Magnetics, vol. Mag-18, No. 6, Nov. 1982.

Ishil, A., "A Magnetooptic Video Disk Readout Method Using a Pair of Polarized Laser Beams", Electronics and Communications in Japan, vol. 63-C, No. 2, 1980.

Primary Examiner—Stuart S. Levy
Assistant Examiner—Hoa Nguyen
Attorney, Agent, or Firm—Nutter, McClennen & Fish

[57] ABSTRACT

An optical mass storage device for use in data processing systems. Two or more lasers provide separate read and write laser beams having different wavelengths. The read and write laser beams can be orthogonally polarized. A polarizing beam splitter combines the read and write beams along a common optical path to an optical head. The head directs the combined beam to a magneto-optic storage medium. A read beam is reflected back by the medium to the common path through the head. A dichroic beam splitter disposed in the common path between the head and the polarizing splitter reflects the read beam to an optical detector. If more than one write laser is necessary, a second dichroic splitter can be used to combine the multiple write beams and the read beam.

7 Claims, 3 Drawing Sheets

MAGNETO-OPTICAL DATA RECORDING DEVICE USING A WAVELENGTH AND POLARIZATION-SENSITIVE SPLITTER

BACKGROUND OF THE INVENTION

This invention relates generally to the field of mass storage devices for use in digital data processing systems and more specifically to magneto-optical data storage devices.

Magneto-optical mass storage devices record data by using a focused laser beam to locally heat a minute portion of a magnetic storage medium, which is typically is constructed as a rotating disk. The coercivity of that portion of the medium is thereby lowered, allowing the magnetic polarity in that portion to be reversed by an applied magnetic field of lower intensity than would otherwise be required. Retrieval of data is accomplished by illuminating successive portions of the storage medium with a linearly polarized laser beam. The Kerr rotation effect causes the plane of polarization of the illuminating beam to be rotated clockwise or counterclockwise, depending on the magnetic polarity in the illuminated portion of the storage medium. This polarization rotation is sensed, typically with a pair of optical detectors and a polarizing beam splitter, to produce an output data signal.

Limitations on the efficiency of magneto-optical storage devices involve the data transfer rate, i.e. the rate at which data is written onto the storage medium, and the signal-to-noise ratio characterizing retrieval of data from the medium. A high data transfer rate requires high laser power at the medium during the write operation so as to rapidly heat successive portions of the medium in which the data is to be written. A high signal-to-noise ratio requires a high transmittance in the path of energy reflected from the medium to the detectors.

In typical prior magneto-optical storage devices these requirements conflict. A single laser is used for both writing and reading and a beam splitter is included in the optical train to direct a portion of the light reflected from the storage medium onto the optical detectors. A compromise must thus be reached between the amount of light that reaches the medium during the write operations and the amount that reaches the optical detectors during retrieval (read) operations.

Specifically, if the beam splitter is to have high transmittance, the write laser power will be high but the signal-to-noise ratio during read operations will be low. The converse will be true if the beam splitter is made to have a high reflectance. In a typical-magneto optical storage device the beam splitter has a transmittance of approximately 50%. As a result the portion of the laser output reaching the storage medium during write operations is somewhat less than that, typically only 30–40%.

Moreover, the write operations have typically required a data verification cycle following the writing of data onto the storage medium in order to make sure that the data has been accurately stored. This materially reduces the effective data transfer rate.

It should be noted that the foregoing problems are not inherent in write-once or read-only optical storage devices. In these devices data retrieval does not utilize the polarization properties of the laser beam. High efficiency is therefore achieved in both the read and write operations by the simple expedient of incorporating a quarter-wave plate into the optical path. The plate is positioned between the beam splitter, which is polarization sensitive, and an objective lens that converges the light beam impinging on the storage medium. This provides a highly efficient mechanism for separating the reflected light from the incident beam. In a magneto-optical device a quarterwave plate cannot be used, as it causes the medium to be illuminated by circularly polarized light, whereas linear polarization is needed in order to observe the Kerr rotation effect during data retrieval operations.

SUMMARY OF THE INVENTION

A magneto-optical storage device incorporating the invention comprises two or more lasers, one for reading and one or more for writing, the write lasers having a different wavelength from that of the read laser. The invention also comprises a novel optical train that conducts light from the lasers to the storage medium and conducts, to the optical detectors, light from the read laser that is reflected by the storage medium.

Specifically, the optical paths of the read and write lasers are combined by means of a polarizing beam splitter. The lasers have orthogonal planes of polarization and they are oriented so that the output of the write laser is transmitted by the beam splitter with minimal loss, while the output of the read laser is reflected along the common optical path.

The combined optical path then passes through a dichroic beam splitter which has a high transmittance at the wavelength of the write laser and a reflectance of approximately 50% at the wavelength of the read laser for the polarization (p) of the latter laser. It has a relatively high reflectance at the read laser wavelength for the orthogonal s-polarization.

The laser beams pass from the dichroic beam splitter to an optical head that focuses the laser beams onto the storage medium. Light reflected from the storage medium is recollimated by the objective lens and returned to the dichroic beam splitter, which reflects the read laser beam but not the write laser beam, to the optical detectors.

With the forgoing arrangement the output of the write laser reaches the storage medium with relatively little attenuation. Thus the storage system is capable of a high data transfer rate without the use of high-power write lasers, which are more expensive and relatively unreliable. At the same time the dichroic beam splitter efficiently reflects the s-polarization component of the reflected read laser beam, thereby enhancing the Kerr rotation effect and improving the signal-to-noise ratio in the output signal during data retrieval.

In this connection it should be noted that the dichroic beam splitter transmits essentially all of the write laser energy reflected from the storage medium and thereby separates it from the reflected read laser beam. This helps to prevent the write laser energy from interfering with detection of reflected read laser energy.

If data verification is desired, it can be accomplished simultaneously with the write operation. The beam from the read laser can be offset from that of the write laser so that it is focused slightly behind the focal point of the write laser beam on the storage medium. Then, once the writing operation proceeds, the read operation may follow along behind it.

Separate write and read lasers have been used before in write-once systems. One system of- this type is described in Howe, D. G., and Marchant, A. B., "Digital Optical Recording in Infrared-Sensitive Organic Polymers", PROC. SPIE, Vol. 382, pp. 103–115, 1983. This is a dipolymer write-once medium that requires writing at one wavelength and reading at another. Another system, described in Hamada, K. et al., "Two Beam Optical Head", PROC. SPIE, Vol. 695, pg. 182, 1986, is a write-once system having separate read and write lasers that operate at different wavelengths to enable data verification while writing. However, high data transfer rates are achievable in a write-once system even with a single laser for both reading and writing. Thus the prior art has provided no suggestion that separate read and write lasers having different wavelengths and polarizations can be used to advantage in a magneto optical storage system and indeed none of these systems have been provided prior to the present invention.

BRIEF DESCRIPTION OF THE DRAWINGS

This invention is pointed out with particularity in the appended claims. The above and further advantages of the invention may be better understood by referring to the following description taken in conjunction with the accompanying drawings, in which:

DETAILED DESCRIPTION OF AN ILLUSTRATIVE EMBODIMENT

Figure 1:
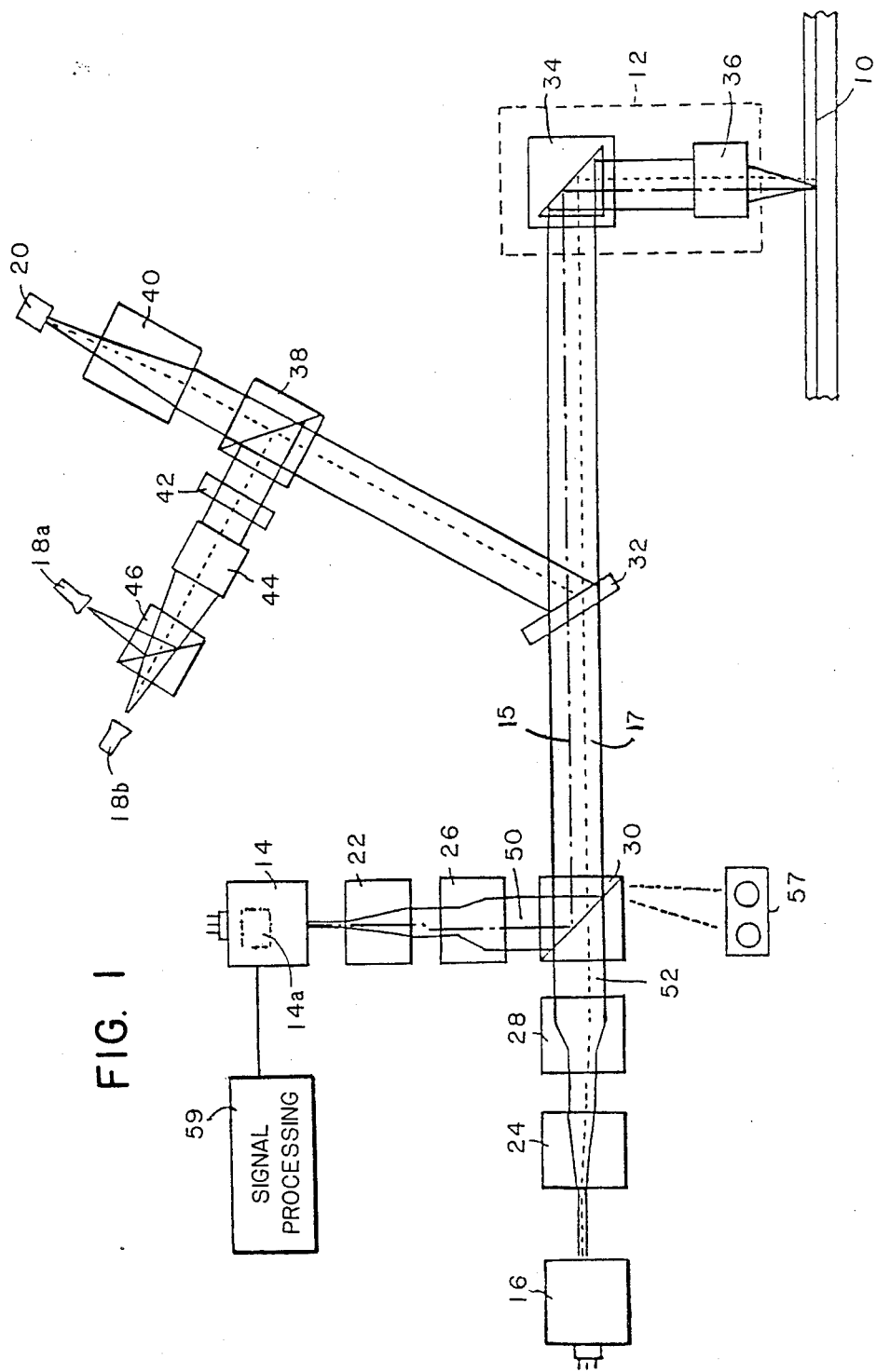
FIG. 1 is a diagram of a magneto-optical storage system incorporating the invention.

As shown in FIG. 1, a storage system embodying the invention includes a magneto-optical storage medium in the form of a disk 10 mounted for rotation beneath an optical read/write head 12. The head 12 focuses onto the disk 10 light emitted by a write laser 14 and a read laser 16. Read laser light reflected from the disk 10 is fed to optical detectors 18a and 18b for retrieval of data from the disk 10 and to a quad cell 20 used in focusing and track following operations.

More specifically, the beams generated by the lasers 14 and 16 are collimated and circularized by collimating lenses 22 and 24 and prism assemblies 26 and 28, respectively. The read laser beam is indicated by dashed line 17 and the write laser beam by dashed line 15. The laser beams are combined by a polarizing beam splitter 30 which reflects the beam from the write laser 14 and transmits the beam from the read laser 16. The beams then pass through a dichroic beam splitter 32 to the read/write head 12 where a folding prism 34 redirects the beams downward to an objective lens 36. The lens 36 focuses the beams onto the disk 10.

The light reflected from the disk 10 is recollimated by the lens 36 and redirected by the prism 34 to the dichroic beam splitter 32. The reflected beam from the beam splitter 32 is directed to another beam splitter 38 which passes a small portion of the light to focusing optics 40 which focus the light onto the quad cell 20. The light reflected by the beam splitter 38 passes through a half-wave plate 42 to a focusing lens 44 and a polarizing beam splitter 46 on the way to the detectors 18a and 18b.

With further reference to FIG. 1, the lasers 14 and 16 emit at different wavelengths, for example, 830 nm for the write laser 14 and 780 nm for the read laser 16. The lasers are oriented so as to have orthogonal planes of polarization. Specifically, the beam from the write laser 14 has an s-polarization with respect to the dichroic beam splitter 32, i.e. perpendicular to the plane of the drawing as indicated at 50. Correspondingly, the beam from the read laser 16 has a p-polarization as indicated at 52. With this arrangement the beam splitter 32 has a high transmittance for the light from the write laser 14 and approximately 50% transmittance for the light from the read laser 16. Conversely it has high reflectance at the wavelength of the read laser 16 for light having the s-polarization.

Figure 2:
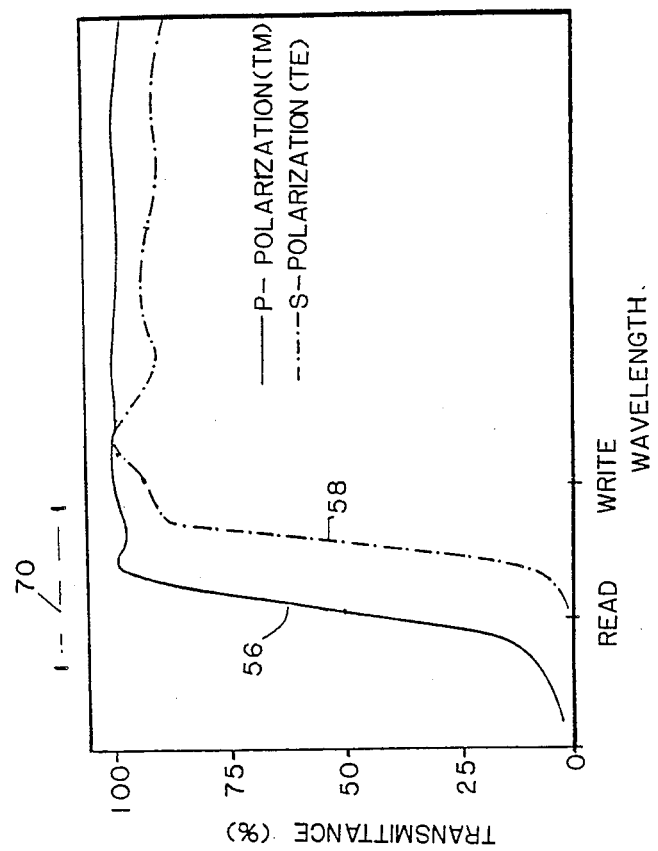
FIG. 2 is a graph depicting the transmission and reflection characteristics of a dichroic beam splitter used in the storage system.

FIG. 2 graphically depicts the transmission characteristics of a typical dichroic beam splitter 32. The curve 56 shows the response for p-polarization and the curve 58 shows the response for s-polarization. The beam splitter 32 transmits over 90% of the energy in the write laser beam, which has a wavelength of 830 nm. When taken in conjunction with the high efficiency of the polarizing beam splitter 30, typically in excess of 98%, this means that over 90% of the optical power generated by the write laser 14 is delivered to the disk 10. In turn this provides a relatively high data rate for a given laser power or, for a given data rate, reduces the power requirement for the write laser 14, thereby reducing the cost of the laser and increasing its reliability.

Energy from the write laser 14 that is reflected from the disk 10 is almost completely transmitted by the beam splitter 32 and thus very little of it is reflected toward the sensing components, where it might interfere with the operation thereof.

The incident beam from the read laser 16, being p-polarized and having a wavelength of 780 nm, is half transmitted by the beam splitter 32 and half reflected. Light from the read laser 16 that is reflected by the disk 10 is also approximately 50% reflected, this time toward the beam splitter 38 as indicated by the curve 56 in FIG. 2. Moreover, the polarization of the read laser beam is rotated slightly by the Kerr effect, the direction depending on the direction of magnetization of the disk 10 at the point of reflection. This imparts an s-component to the reflected read laser beam. As shown in FIG. 2 (curve 58), the beam splitter 32 has essentially zero transmittance of this component at the read laser wavelength. Thus essentially all of the energy having this component is reflected toward the beam splitter 38. This has the effect of boosting the Kerr rotation, thereby increasing the signal-to noise-ratio of the reflected read laser energy.

The beam splitter 46 and the detectors 18a and 18b are arranged conventionally, with the beam splitter 46 thus providing equal transmission and reflection for unrotated read laser light. The reflected energy from the beam splitter 46 is thus greater than the transmitted energy for one magnetic polarization of the disk 10 and less than the transmitted energy for the opposite magnetic polarization.

The quad cell 20 can be a conventional four-detector cell used to provide a feedback signal for servo systems controlling the radial position of the read/write head 12 relative to the rotating disk 10 and the focusing of the beams onto the disk 10. The details of the servo systems are not part of the present invention. However, in general, they involve the recording of servo marks on the disk 10 at intervals along each track and the sensing of these marks by reflections therefrom transmitted to the quad cell 20. Also, the storage system preferably provides for adjustment of the relative focus positions of the read and write beam to focus them in the same plane and to position the focus of the read beam slightly "behind" the write beam on the disk 10. The latter feature permits "direct read after write", for immediate data verification. For these purposes the write laser unit (i.e. laser and beam-forming optics) is preferably adjustable by a mechanism (not shown) in both the longitudinal and transverse directions. Alternatively relative beam position can be adjusted by rotation of the beam splitter 30. This is accomplished by means of control knobs 57 mechanically linked to the beam splitter 30.

It may be desirable to monitor the radial position of the write beam on the disk 10 with respect to that of the read beam. For this, we prefer to use an energy sensing photodiode 14a typically provided at the rear of the write laser 14 to monitor the power output of the laser. The write laser 14 is operated as a continuous wave device at a power level below the level required for writing. Reflections from the disk 10 pass through the laser 14 to the diode 14a. The reflections from the servo marks on the disk 10 are thus translated into electrical signals by the diode 14a and these signals can be processed in a known manner by signal processing circuitry 59 to ascertain the radial position of the write beam relative to the track being followed by the system and, thus, relative to the radial position of the read beam.

Figure 3:
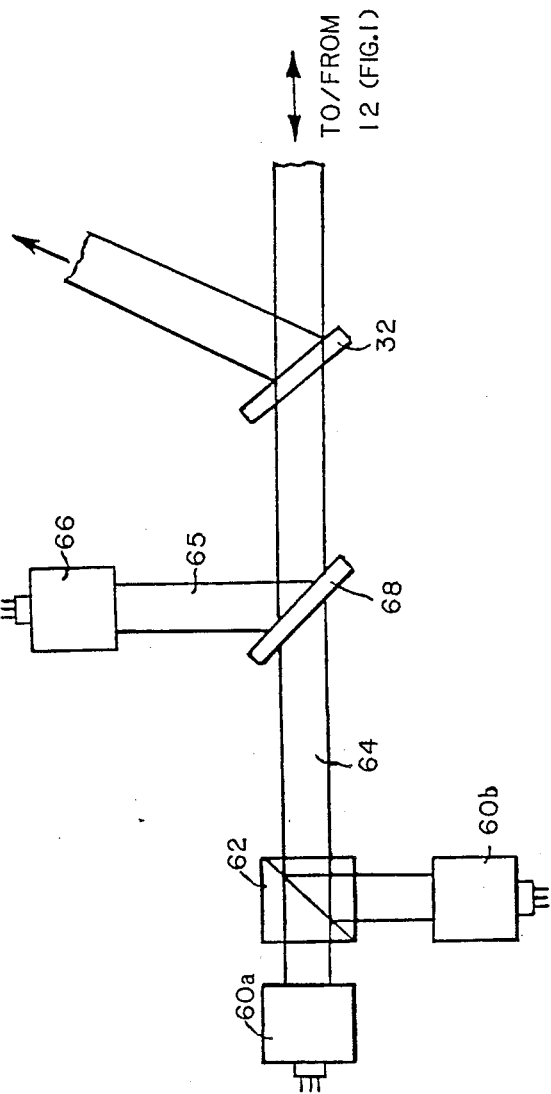
FIG. 3 is a diagram of a storage system using a pair of write lasers.

FIG. 3 illustrates a system capable of higher data storage density on the magneto-optical disk 10. In general the wavelength of the laser energy is a limitation on the data density and, in particular, a higher density requires a shorter wavelength. However, solid state lasers emitting light at wavelengths substantially shorter than the illustrative wavelengths set forth above have a substantially lower power capability. The system depicted in FIG. 3 compensates for this by employing a pair of write lasers.

More specifically the system shown in FIG. 3 includes a pair of write laser units 60a and 60b having orthogonal polarizations. A polarizing beam splitter 62 combines the outputs of the write lasers into a single beam shown at 64. A dichroic beam splitter 68 combines beam 64 with the beam 65 from the read laser unit 66. Specifically the beam splitter 68 is constructed to transmit essentially all energy at the write wavelength and reflect essentially all energy at the read wavelength. With reference to FIG. 2, it can be seen that this can be accomplished by constructing the beam splitter 60a so that the transition region 70 is between the write and read wavelengths.

The remainder of the FIG. 3 system is the same as that of FIG. 1. Thus the dichroic beam splitter 32 is again constructed to maximize reflection of the orthogonal component of the reflected read beam.

The foregoing description has been limited to specific embodiments of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A mass storage device for use in a data processing system, said device comprising:
   A. a rotating magneto-optical storage medium;
   B. read laser means for providing a read laser beam having a first wavelength and a p-polarization;
   C. write laser means for providing a write laser beam having a second wavelength and an s-polarization orthogonal to the p-polarization of the read laser beam;
   D. polarizing beam splitter means fed by the read and write laser beams, for providing a polarized read and write laser beams;
   E. optical head means, fed by the polarized read and write laser beams for presenting the polarized read and write laser beams to the storage medium and providing a read return beam and a write return beam reflected by the medium; and
   F. dichroic beam splitter means, disposed between the polarizing beam splitter means and the optical head means, high transmittance at the write laser beam wavelength and polarization, almost complete transmittance at the write return beam wavelength and polarization, and high reflectance at the read return beam wavelength and polarization.

2. Device as in claim 1 additionally comprising means for focusing the polarized read and write beams at locations on the medium, with the read laser beam location being behind the write laser beam location.

3. An optical data storage device comprising:
   A. read laser means for providing a read laser beam having a p-polarization and a first wavelength;
   B. write laser means for providing a write laser beam having an s-polarization and a second wavelength different from the first wavelength;
   C. polarizing beam splitter means for providing a read laser beam and write laser beam along a common optical path;
   D. an optical storage medium;
   E. optical head means, disposed in the common optical path, for focusing the read and write beam onto the storage medium and providing a reflected read beam and a reflected write beam from the storage medium;
   F. optical detector means; and
   G. dichroic beam splitter means, disposed in the common optical path between the polarizing beam splitter means and the medium, for passing the read and write beams from the polarizing beam splitter means to the medium, for reflecting most of the energy in the reflected read beam toward the optical detector means, and for passing most of the energy in the reflected write beam away from the optical detector means.

4. Device as in claim 3 in which said write laser means comprises a plurality of light laser units and including means for combining the beams from said write laser units to provide said write laser beam.

5. Device as in claim 4 including second dichroic beam splitter means, receiving the read beam and the write beam, for reflecting the read beam to the common optical path and transmitting the write beam to the common optical path.

6. Device as in claim 1 wherein the dichroic beam splitter means additionally directs the reflected write beam back toward the polarizing beams splitter and hence toward the write laser means, additionally comprising:
   A. a second detector, coupled to the write laser means, that provides an output signal corresponding to a power travelling rearward in said write laser means, the output signal from said second detector thereby providing an indication of the power in the reflected write beam reflected from said optical storage medium at the wavelength of said write laser means, and B. signal processing circuitry for processing the output signal from said second detector to provide an indication of the position of the write laser beam on said storage medium.

7. A method for reading and writing data onto a magneto-optical storage medium, the method comprising the steps of:

A. providing a read laser beam having a first wavelength and a p-polarization;

B. providing a write laser beam having a second wavelength and an s-polarization orthogonal to the p-polarization of the read laser beam;

C. directing the read and write laser beams to the medium along a common optical path using polarizing beam splitter means;

D. passing the directed read and write beams through a dichroic beam splitter;

E. directing the read and write beams from the dichroic beam splitter to the magneto-optic storage medium and thus generating a reflected read beam and a reflected write beam;

F. recollimating the reflected read and write beams; and

G. directing the recollimated reflected beam back to the dichroic beam splitter such that most of the energy in the reflected read beam is reflected off the dichroic beam splitter toward a detector, and most of the energy in the reflected write beam is passed through the dichroic beam splitter.

* * * * *